United States Patent
Marsh et al.

(10) Patent No.: US 6,829,129 B2
(45) Date of Patent: Dec. 7, 2004

(54) TRI-MODE OVER-VOLTAGE PROTECTION AND DISCONNECT CIRCUIT APPARATUS AND METHOD

(75) Inventors: Richard N. Marsh, Cool, CA (US); Anthony M. Wu, San Francisco, CA (US)

(73) Assignee: Monster, LLC, Las Vegas, NV (US)

(*) Notice: Subject to any disclaimer, the term of this patent is extended or adjusted under 35 U.S.C. 154(b) by 129 days.

(21) Appl. No.: 10/046,062

(22) Filed: Jan. 11, 2002

(65) Prior Publication Data

US 2003/0227733 A1 Dec. 11, 2003

Related U.S. Application Data

(63) Continuation-in-part of application No. 09/713,360, filed on Nov. 14, 2000.

(51) Int. Cl.[7] .............................................. H02H 3/22
(52) U.S. Cl. ..................................................... 361/111
(58) Field of Search ............................. 361/38, 88, 119, 361/56, 111

(56) References Cited

U.S. PATENT DOCUMENTS

| | | | | |
|---|---|---|---|---|
| 4,901,183 A | * | 2/1990 | Lee | 361/56 |
| 6,055,147 A | * | 4/2000 | Jeffries et al. | 361/103 |

* cited by examiner

*Primary Examiner*—Brian Sircus
*Assistant Examiner*—Boris Benenson
(74) *Attorney, Agent, or Firm*—LaRiviere, Grubman & Payne, LLP

(57) ABSTRACT

A single-phase apparatus and method for protecting for all AC power wires/lines and combinations thereof. The present invention prevents (1) the hazardous condition occurring at the wall receptacle, arising from accidental reversal of the line wire with the neutral wire, from adversely affecting at least one peripheral device in the line, and (2) the overheating and destruction of components in an over-voltage protection circuit by providing an efficient circuit configuration which assures a rapid simultaneous disconnect of both the hot line and neutral power lines. The present invention achieves this by opening the circuit to simultaneously disconnect both line and neutral power lines feeding a load when the over-voltage event occurs in any of three wire pairings: line-to-neutral, line-to-ground, or neutral-to-ground.

14 Claims, 1 Drawing Sheet

TRI-MODE OVER-VOLTAGE PROTECTION AND DISCONNECT CIRCUIT APPARATUS AND METHOD

CROSS-REFERENCE TO RELATED APPLICATIONS

This application is a continuation-in-part of U.S. patent application Ser. No. 09/713,360, filed on Nov. 14, 2000, entitled TRI-MODE OVER-VOLTAGE PROTECTION AND DISCONNECT CIRCUIT APPARATUS AND METHOD.

TECHNICAL FIELD

The present invention relates to over-voltage protection circuits. More particularly, the present invention relates to over-voltage protection circuits having metal oxide varistor (MOV) devices as the over-voltage sensing component. Even more particularly, the present invention relates to over-voltage protection circuits having MOV devices as the over-voltage sensing component for utilization in alternating current (AC) electric power distribution.

BACKGROUND OF THE INVENTION

The current state of the art electronic components (e.g., both commercial and residential computers and related equipment) accommodate transient voltage surge suppression features for protecting their highly sensitive circuits from over-voltage damage. Most transient normal use and cannot handle a major over-voltage condition as would occur during loss of neutral, loss of ground, or repetitive current pulses (e.g., from a lightning strike). Typical voltage surge protection devices comprise a plurality of fault fuses where the input is disconnected from the output as a result of an over-current condition resulting from the over-voltage. The related art surge suppression systems may also involve various metal oxide varistor (MOV) and fuse combinations. MOVs are typically non-linear devices formed from composite ceramic materials (e.g., ZnO grains in combination with an amorphous material). MOVs maintain the voltage within a narrow band (i.e., varistor voltage) over a wide current range. During major over-voltage conditions, the MOVs may generate heat so excessive that they will rupture or explode, thereby allowing the related electronic equipment to be destroyed.

Some related art surge suppression apparatus patents include:

(1) U.S. Pat. No. 6,055,147 to Jeffries et al. which teaches a plurality of MOVs being in series with a plurality of thermal fuses;
(2) U.S. Pat. No. 5,412,526 to Kapp et al. which teaches a plurality of MOVs being in series with a plurality of thermal fuses, and the plurality of MOVs being in parallel with a plurality of resistors;
(3) U.S. Pat. No. 6,040,971 to Martenson et al. which teaches a plurality of MOVs being in parallel with one another, an MOV being in parallel with a thermal fuse, and the thermal fuse being in series with a circuit protection device having an over-voltage trip device;
(4) U.S. Pat. No. 5,388,021 to Stahl which teaches a plurality of MOVs being in parallel with a plurality of resistors and a plurality of inductors, and a plurality of MOVs being in parallel with another;
(5) U.S. Pat. No. 5,675,468 to Chang which teaches two input terminals, two fuses in series respectively, a triac, an MOV in series between one fuse and an output terminal, a static potential limiter between the triac and ground;
(6) U.S. Pat. No. 4,901,183 to Lee which teaches two MOVs being in parallel with one another, two thermal fuses being in parallel with one another, a capacitor being in parallel with an MOV, two capacitors being in parallel with one another, and two inductors being in parallel with one another;
(7) U.S. Pat. No. 6,038,117 to Dullni et al. which teaches pairs of MOVs being in parallel, a plurality of such pairs being in series with one another and in series with a relay;
(8) U.S. Pat. No. 5,534,769 to Ishii which teaches resistor-capacitor combinations; and
(9) U.S. Pat. No. 5,808,850 to Carpenter, Jr. which teaches a three-phase device having quadruplets of parallel MOVs, each quadruplet being in series with a thermal fuse and an inductor, and bulbs for an indicator light for line to ground only.

A typical problem not addressed by these related art devices is that if an electrician accidentally reverses the line wire and the neutral wire, creating an extremely hazardous situation at the wall receptacle, the device may not adequately succeed in disconnecting the circuit to a peripheral device. In addition, the related art patents maintain an inordinately high component count to achieve their purpose of surge suppression. Therefore, a need exists for a circuit apparatus and a method which prevent (1) the hazardous condition occurring at the wall receptacle, arising from accidental reversal of the line wire with the neutral wire, from adversely affecting at least one peripheral device in the line, and (2) the overheating and destruction of MOVs in an over-voltage protection circuit by providing an efficient circuit configuration (i.e., the minimum number of components for device size reduction) which assures a rapid simultaneous disconnect of both the hot line and the neutral line.

BRIEF SUMMARY OF THE INVENTION

An object of the present invention is to provide an apparatus and a method which prevent the overheating and destruction of MOVs in an over-voltage protection circuit by providing an efficient circuit configuration (i.e., the minimum number of components for device size reduction) which assures a rapid simultaneous disconnect of both the hot line and neutral power lines, and responds to the overheating of MOVs in an over-voltage protection circuit by opening the circuit to simultaneously disconnect both the hot line and the neutral line feeding a load when the over-voltage event occurs in the line-to-neutral (L-N) pairing.

Another object of the present invention is to provide an apparatus and a method which prevent the hazardous condition occurring at the wall receptacle which arises from accidental reversal of the line wire with the neutral wire from adversely affecting at least one peripheral device in the line, by detecting such reversal upon connection of the apparatus to the wall receptacle and alerting the user to the hazardous condition by appropriate illumination of warning lights or sounding of an audible alarm, or both. The user can then effect a correction before proceding.

Accordingly, the present invention provides a single-phase over-voltage protection circuit apparatus for all AC power lines and combinations thereof. In particular, the present invention provides an apparatus and a method which (1) indicates the hazardous condition occurring at the wall receptacle arising from accidental reversal of the line wire with the neutral wire from adversely affecting at least one peripheral device in the line by alerting the user to the unsafe condition, and (2) the overheating and destruction of MOVs in an over-voltage protection circuit by providing an efficient circuit configuration which assures a rapid simultaneous disconnect of both the hot line and neutral line. The present invention achieves this by opening the circuit to disconnect either or both of the hot line and neutral line feeding a load when the over-voltage event occurs in the hot line to neutral line (L-N) pairing.

By example, in a single phase AC power system, the hot line, the neutral line, and ground line (G) are all paths vulnerable to destructive high voltages. The present invention protects these paths by providing protection devices in the form of metal oxide varistors (MOVs) in parallel for each pair of wires (i.e., hot line to neutral, hot line to ground, and neutral to ground). The apparatus additionally comprises in-line fuses that disconnect both the hot line as well as the neutral line from the load. The MOV devices are activated by an over-voltage condition and absorb the extra and potentially damaging power surges and over-voltages; when the capacity of a MOV is exceeded, the MOV will generate excessive surface heat to transfer and current to flow to a thermal fuse, which then opens the fuse to protect the load.

Accordingly, in the event of a sufficiently high voltage (i.e., $V_{L-N}>120V$ to $130V$), from hot line-to-neutral or hot line-to-ground, causing excessive heating of the MOV protection devices, the hot line and neutral line will be disconnected from the user's connected equipment. This disconnect is facilitated by the use of an open circuit condition of the in-line special thermal fuses, a non-resettable disconnect condition. The blown thermal fuses must be replaced to restore the circuit.

The current through the line may be denoted by $I_L$. The current through an MOV, $I_{MOV}$, must remain less than the rated current for the MOV, $I_{MOV-rated}$, in normal operation. During an over-voltage event where the current through the MOV exceeds its current rating (i.e., $I_{MOV}>I_{MOV-rated}$), thereby emitting high surface temperature and effecting a current through the thermal fuse which exceeds its current rating ($I_L=I_{TF}$, $I_{TF}>I_{TF-rated}$), such thermal fuse will open, thereby preventing voltage application to the load (See FIG. 1).

In all the foregoing protection modes (i.e., L-N, L-G, N-G), a warning feature may be provided which indicates that a protection device (e.g., an MOV) has absorbed an excessive energy, thereby opening a thermal fuse or circuit breaker which effectively opens the path to any protection device and to the load. The warning feature may continue to alert the user even if power is no longer applied to the equipment. This warning feature alerts the user of the otherwise potentially destructive event. Upon so alerting the user, the apparatus should be unplugged from the wall outlet and the thermal fuse(s) replaced or circuit breaker reset. This warning feature may be audio and/or visual in nature.

Other features of the present invention are disclosed, or are apparent in the section entitled "DETAILED DESCRIPTION OF THE INVENTION."

BRIEF DESCRIPTION OF DRAWING

For a fuller understanding of the present invention, the accompanying drawing is below-referenced.

DETAILED DESCRIPTION OF THE INVENTION

Figure 1:
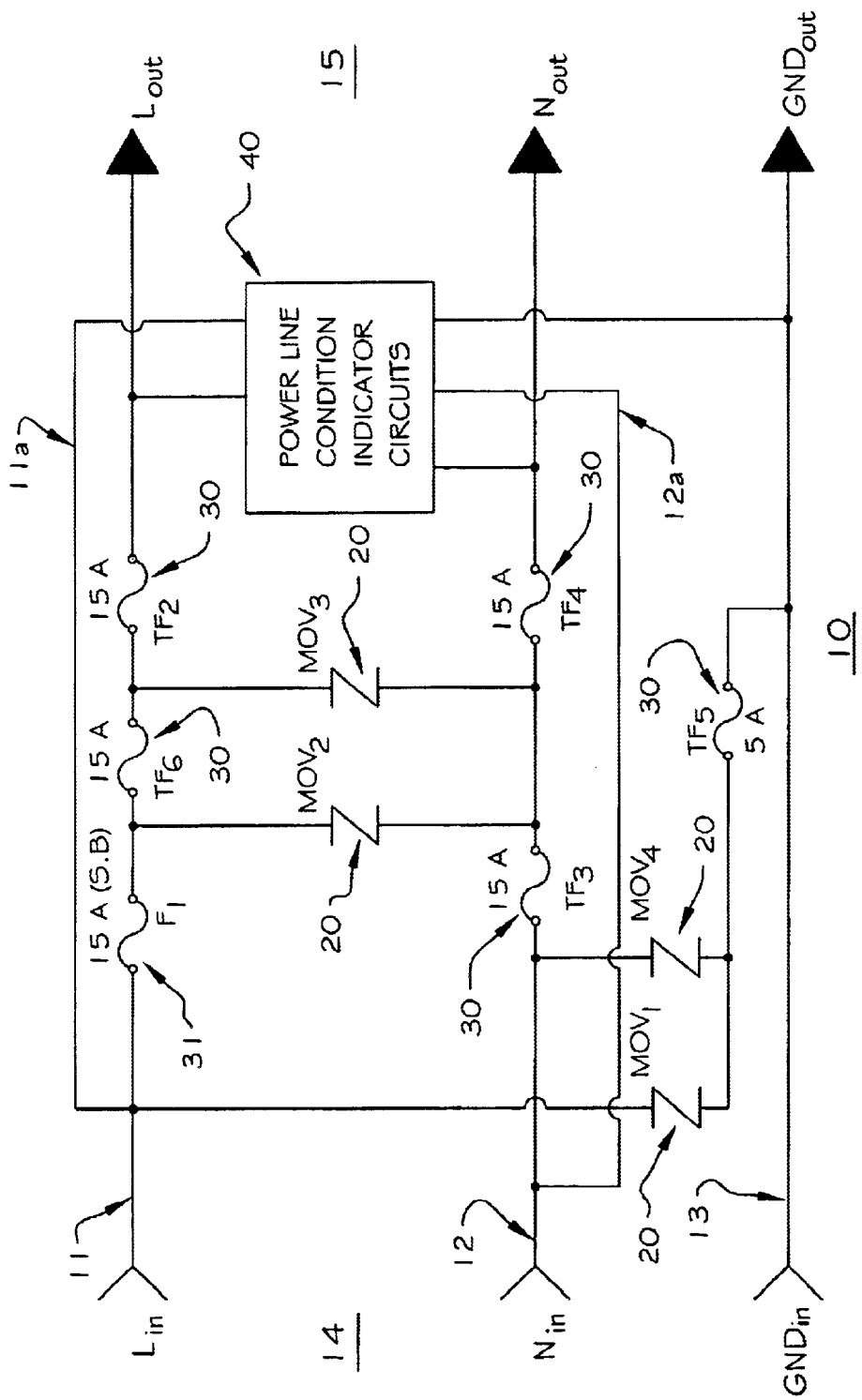
FIG. 1 is a schematic view of a tri-mode over-voltage protection and disconnect circuit apparatus, in accordance with the present invention.

FIG. 1 schematically illustrates the preferred embodiment of a single-phase tri-mode over-voltage circuit protection apparatus 10, in accordance with the present invention. By example, the apparatus 10 comprises: an electronic circuit comprising a power input portion 14, having three power input connectors that electrically couple to a hot line 11, a neutral line 12, and a ground line 13 disposed internal to the over-voltage protection apparatus. By example, power input portion 14 receives AC power from a single phase power source comprising a 120VAC line voltage measured from line-to-neutral and includes a safety ground line (not shown). Under normal operations during use of the present invention, the circuit lines 11, 12, and 13 electrically couple the AC power source to at least one peripheral device (not shown) via power output portion 15. The power output portion 15, by example, may comprise three or more power output connectors (not shown) that distribute AC power via continuation of hot line 11, neutral line 12, and ground line 13 to a peripheral device (not shown). The power output connectors being electrically coupled with at least one peripheral device.

In the preferred embodiment, four protection devices, such as metal oxide varistors (MOVs) 20 absorb any power surges and over-voltages. Each of the four MOVs 20 are disposed between three line pairings, namely two MOVs 20 between hot line 11 to neutral line 12 (L-N), one MOV between hot line 11 to ground line 13 (L-G), and one MOV between neutral line 12 to ground line 13 (N-G). The apparatus 10 further comprises five thermal fuses ($TF_2$, $TF_3$ $TF_4$, $TF_5$, $TF_6$) 30 and one slow-blow fuse 31 ($F_1$). Fuses $F_1$, $TF_2$, and $TF_6$ are disposed in series with the hot line 11, with fuses $TF_3$ and $TF_4$ being disposed in series with neutral line 12 and $TF_5$ being effectively disposed in series with $MOV_1$ and $MOV_4$ disposed as the over-voltage protection device between the ground line 13 and the hot line 11 and neutral line 12. Alternatively, appropriately designed protective devices such as circuit breakers or similar devices, slow-blow fuses, fast-blow fuses or thermal fuses may be used. For convenience, any such protective device is referred to herein as a fuse but is to be understood to include fuses, circuit breakers or similar devices.

Continuing to refer to FIG. 1, under normal operating condition, the four MOV 20 devices are high impedance components which facilitate distribution of the line voltage to any connected peripheral equipment. The MOVs are capable of absorbing some transient over-voltages without failure, thereby protecting the connected peripheral devices. The current through hot line 11 is denoted by $I_L$. The current through an MOV 20 is denoted as $I_{MOV1}$, $I_{MOV2}$, $I_{MOV3}$, respectively, and must remain less than its rated current, $I_{MOV-rated}$, under normal operation. During an excessive over-voltage event, the particular affected MOV 20 is responsive by a lowering of its impedance such that the current through the device 20 is greater than its current rating (i.e., $I_{MOV}>I_{MOV-rated}$) This effectively results in a current demand through a thermal fuse 30 greater than its current rating ($I_L=I_{TF}$, $I_{TF}>I_{TF-rated}$). Such over-voltage condition causes an affected thermal fuse 30 to open (blow). The opening of the fuse 30 prevents excessive heating of the affected respective one of the four MOVs 20. For safety reasons, the ground line 13 is not disconnected from the ground output G at the output connector. For a neutral to ground over-voltage condition, $MOV_4$ will cause the fuse $TF_5$ to open.

The apparatus 10 may further comprise a warning feature 40 (i.e., an indicator or indicators that the hot line and neural line are reversed and/or an over-voltage indicator) for indicating that at least one of the four MOVs 20 has responded to an over-voltage condition which has effected opening of at least one respective thermal fuse 30. The warning feature 40 comprises at least one warning feature selected from a group of warning features consisting essentially of an indicator light, an LED indicator, and/or an audible alarm such as a buzzer or the like, warning that AC power has been disconnected to the peripheral equipment due to an over-voltage (O-V) condition. The warning devices may include normally-on green indicators indicating proper operation and/or red indicators indicating a fault operation when illuminated. As depicted and by example only, the warning feature 40 is separately energized from the input AC power source through circuit 11a–12a. When an overvoltage causes disconnection of either hot line 11 or neutral line 12, appropriate indicator lights will be illuminated and/or an audible alarm may sound, indicating that the device 10 has disconnected power to the load. The apparatus 10 may be disengaged from the power source after alerting by the warning feature 40, and may then be replaced or reset. Apparatus 10 may optionally include ON/OFF switches (not shown), for power distribution, and/or for safety considerations. Further, apparatus 10 may include electronic filters at either the input 14 or output 15 sides to remove interference such as static or noise, as is known in the art.

EXAMPLE 1 OF THE APPARATUS

A tri-mode over-voltage protection and disconnect circuit apparatus may comprise a first over-voltage protection circuit (e.g. $MOV_1$ & $TF_5$) disposed between a hot line and a ground line; second and third over-voltage protection circuits disposed between the hot line and a neutral line; and a fourth over-voltage protection circuit disposed between the neutral line and the ground line.

EXAMPLE 2 OF THE APPARATUS

The apparatus, as described in Example 1, may further comprise an indicator or indicators that the hot line and neutral lines are reversed and/or at least one warning feature for indicating that an over-voltage condition has occurred, the indicators and at least one warning feature being selected from a group of warning features consisting essentially of an indicator light and an LED indicator.

EXAMPLE 3 OF THE APPARATUS

In the apparatus, as described in Example 1, each of the over-voltage protection circuits may comprise a respective fuse and a metal oxide varistor (MOV). The fuse ($TF_5$) associated with the first over-voltage protection circuit between hot line 11 and ground line 13 is disposed in parallel with the hot line 11 and ground line 13; the fuse ($TF_3$) associated with the second over-voltage protection circuit between hot line 11 and neutral line 12 is disposed in series with the neutral line 12; the fuse ($TF_6$) associated with the third over-voltage protection circuit is disposed in series with the hot line 11; and the fuse (also $TF_5$) associated with the fourth over-voltage protection circuit is disposed in parallel between the neutral line 12 and ground 13. The MOVs ($MOV_2$, $MOV_3$) associated with the second and third over-voltage protection circuits, are disposed in parallel with the hot line 11 and the neutral line 12; the MOV ($MOV_1$) associated with the first over-voltage protection circuit, is disposed in parallel with the hot line 11 and the ground line 13; and the MOV ($MOV_4$) associated with the fourth over-voltage protection circuit, is disposed in parallel with the neutral line 12 and the ground line 13, being disposed in a manner facilitating response to an over-voltage condition occurring between the neutral line and the ground line. A sustained or excessive over-voltage on hot line 11 relative to neutral 12 will activate both $MOV_2$ and $MOV_3$, opening $TF_3$ and $TF_6$, thereby protecting output hot line 11 and neutral 12. Slow-blow fuse 31 ($F_1$) and thermal fuses 30 ($TF_2$ and $TF_4$) provide additional protection for hot line 11 and neutral line 12.

EXAMPLE 4 OF THE APPARATUS

In the apparatus, as described in Example 1–3, an electronic interference filter to remove noise, static and the like may be inserted in the circuit on either the input 14 or output 15 side as is known in the art.

PREFERRED EMBODIMENT OF THE METHOD

The preferred method of the present invention comprises protecting a plurality of peripheral devices by providing a tri-mode over-voltage circuit protection apparatus 10, in accordance with the present invention. By example, the method comprises the steps of providing an electronic circuit, distributing power under normal operating conditions, disconnecting power distribution to peripheral equipment in response to an over-voltage condition occurring on any of the three electrical lines in a single phase electrical power system, namely line-to-neutral, line-to-ground and neutral-to-ground, indicating loss of power due to an over-voltage condition, and restoring power to the peripheral equipment by replacing/resetting the fuses of apparatus 10 as required. Apparatus 10 may include providing ON/OFF switches for power distribution, and/or for safety considerations and may further include providing an electronic interference filter at either the input or output of the device.

EXAMPLE 1 OF THE METHOD

An example of the present invention method of protecting at least one peripheral device from an over-voltage condition comprises: providing a tri-mode over-voltage protection and disconnect circuit apparatus, the apparatus comprising a first and second over-voltage protection circuit disposed between a hot line and a neutral line, a third over-voltage protection circuit disposed between the hot line and a ground line, and a fourth over-voltage protection circuit disposed between the neutral line and the ground line, the apparatus providing AC power to the at least one peripheral device, whereby the hot line and the neutral line are not distributed as an output voltage in the event of an over-voltage condition wherein at least one of the first, second, third and fourth over-voltage protection circuits respond by allowing sufficient current to pass to open a thermal fuse, thereby causing an open state for preventing a hazardous condition at the power source, the hazardous condition arising from an accidental reversal of the hot line wire with the neutral line, and for preventing overheating and destruction of the protection circuits by providing the disconnect of both the hot line and the neutral line; responding to an over-voltage condition, the responding step being activated by at least one of the provided over-voltage protection circuits.

EXAMPLE 2 OF THE METHOD

The method, as described in Example 1, may further comprise providing at least one warning feature for indicating that an over-voltage condition has occurred, the at least one warning feature being selected from a group of warning features consisting essentially of an indicator light and an LED indicator; and warning that an over-voltage condition has occurred by deactivating the provided status warning feature.

EXAMPLE 3 OF THE METHOD

The method, as described in Examples 1 or 2, may further comprise providing at least one electronic interference filter at either the input side or the output side of the device to remove static or noise from the circuit as is known in the art.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims. Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, it should be readily apparent to those of ordinary skill in the art that various changes and modifications in form, semiconductor material, and fabrication material detail may be made without departing from the spirit and scope of the inventions as set forth in the appended claims. No claim herein is to be construed under the provisions of 35 U.S.C. 112, sixth paragraph, unless the element is expressly recited using the phrase "means for."

What is claimed is:

1. A tri-mode over-voltage circuit protection and disconnect apparatus, the apparatus comprising:
   a. a first over-voltage protection circuit disposed between a hot line and a ground line;
   b. a second and a third over-voltage protection circuit disposed between the hot line and a neutral line; and
   c. a fourth over-voltage protection circuit disposed between the neutral line and the ground line;
   d. a warning means for indicating that the input hot line and neutral line are reversed; and
   e. at least one warning means for indicating that an over-voltage condition has occurred, the at least one warning means being selected from a group of warning means consisting of an indicator light, an LED indicator, and an audible alarm;
   whereby the hot line and the neutral line are distributed as an output voltage when the over-voltage protection circuits are functioning, and
   whereby, in the event of an over-voltage condition between the hot line and neutral line the second and third over-voltage protection circuits respond by passing sufficient current to cause at least one protective device to open, wherein the protective device is selected from a group consisting of fast-blow fuse, slow-blow fuse, thermal fuse, and circuit breaker, wherein each of the over-voltage protection circuit comprises
   a. a thermal fuse and
   b. a metal oxide varistor (MOV),
   wherein the thermal fuse associated with the first over-voltage protection circuit is disposed in parallel with the ground line and hot line,
   wherein the thermal fuse associated with the second over-voltage protection circuit is disposed in series with the neutral line,
   wherein the thermal fuse associated with the third over-voltage protection circuit is disposed in series with the hot line,
   wherein the thermal fuse associated with the fourth over-voltage protection circuit is disposed in parallel with the ground line and neutral line,
   wherein the MOV associated with the first over-voltage protection circuit is disposed in parallel with the hot line and the ground line,
   wherein the MOV associated with the second over-voltage protection circuit is disposed in parallel with the hot line and the neutral line,
   wherein the MOV associated with the third over-voltage protection circuit is disposed in parallel with the hot line and the neutral line,
   wherein the MOV associated with the fourth over-voltage protection circuit is disposed in parallel with the neutral line and the ground line,
   whereby the first over-voltage protection circuit being disposed in a manner facilitating response to an over-voltage condition occurring between the hot line and the ground line,
   whereby the second and third over-voltage circuits being disposed in a manner facilitating response to an over-voltage condition occurring between the hot line and the neutral line, and
   whereby the fourth over-voltage protection circuit being disposed in a manner facilitating response to an over-voltage condition occurring between the neutral line and the ground line.

2. A tri-mode over-voltage protection and disconnect circuit apparatus as recited in claim 1, further comprising at least one electronic interference filter.

3. The apparatus as recited in claim 2 further comprising at least one protective device selected from a group consisting of fast-blow fuse, slow-blow fuse, thermal fuse, and circuit breaker.

4. The apparatus, as recited in claim 1, further comprising:
   a warning means for indicating that the input hot line and neutral line are reversed; and
   at least one warning means for indicating that an over-voltage condition has occurred, the at least one warning means being selected from a group of warning means consisting essentially of an indicator light, an LED indicator, and an audible alarm.

5. A tri-mode over-voltage protection and disconnect circuit apparatus, the apparatus comprising:
   a. a first over-voltage protection circuit disposed between a hot line and a ground line;
   b. a second and a third over-voltage protection circuit disposed between the hot line and a neutral line;
   c. a fourth over-voltage protection circuit disposed between the neutral line and the ground line; and
   d. at least one warning means for indicating that an over-voltage condition has occurred and a protective device has operated, the at least one warning means being selected from a group of warning means consisting of an indicator light, an LED indicator, and an audible alarm wherein each of the over-voltage protection circuits comprises:
a. a thermal fuse; and
b. a respective metal oxide varistor (MOV), wherein the thermal fuse associated with the first over-voltage protection circuit is disposed in parallel with the ground line and hot line, wherein the thermal fuse associated with the second over-voltage protection circuit is disposed in series with the neutral line, wherein the thermal fuse associated with the third over-voltage protection circuit is disposed in series with the hot line, wherein the thermal fuse associated with the fourth over-voltage protection circuit is disposed in parallel with the ground line and neutral line, wherein the respective MOV associated with the first over-voltage protection circuit is disposed in parallel with the hot line and the ground line, wherein the respective MOV associated with the second over-voltage protection circuit is disposed in parallel with the hot line and the neutral line, wherein the respective MOV associated with the third over-voltage protection circuit is disposed in parallel with the hot line and the neutral line, wherein the respective MOV associated with the fourth over-voltage protection circuit is disposed in parallel with the neutral line and the ground line; and whereby the respective MOV associated with the fourth over-voltage protection circuit being disposed in a manner facilitating response to an over-voltage condition occurring between the neutral line and the ground line.

6. The apparatus as recited in claim 5 wherein the protective device is selected from a group consisting of fast-blow fuse, slow-blow fuse, thermal fuse, and circuit breaker.

7. A tri-mode over-voltage protection and disconnect circuit apparatus as recited in claim 5, further comprising at least one electronic interference filter.

8. A tri-mode over-voltage protection and disconnect circuit apparatus, the apparatus comprising:
a. a first over-voltage protection means disposed between a hot line and a ground line;
b. a second and third over-voltage protection means disposed between the hot line and a neutral line; and
c. a fourth over-voltage protection means disposed between the neutral line and the ground line, whereby, in the event of an over-voltage condition on the hot line, the second and third over-voltage protection means respond by each opening a thermal protective device, thereby causing an open state such that the hot line and the neutral line are not distributed as an output voltage, wherein each of the over-voltage protection means comprises:
a. a thermal fuse, and
b. a respective metal oxide varistor MOV, wherein the thermal fuse associated with the first over-voltage protection circuit is disposed in parallel between the hot line and the ground line, wherein the thermal fuse associated with the second over-voltage protection circuit is disposed in series with the neutral line, wherein the thermal fuse associated with the third over-voltage protection circuit is disposed in series with the hot line, wherein the thermal fuse associated with the fourth over-voltage protection circuit is disposed in parallel between the neutral line and the ground line, wherein the respective MOV associated with the first over-voltage protection circuit is disposed in parallel with the hot line and the ground line, wherein the respective MOV associated with the second and third over-voltage protection circuits are disposed in parallel with the hot line and the neutral line, and whereby the respective MOV associated with the fourth over-voltage protection circuit being disposed in a manner facilitating response to an over-voltage condition occurring between the neutral line and the ground line.

9. The apparatus as recited in claim 8 further comprising at least one protective device selected from a group consisting of fast-blow fuse, slow-blow fuse, thermal fuse, and circuit breaker.

10. A tri-mode over-voltage protection and disconnect circuit apparatus as recited in claim 8 further comprising at least one electronic interference filter.

11. A method of protecting at least one peripheral device from an over-voltage condition, the method comprising:
providing a tri-mode over-voltage protection and disconnect circuit apparatus, the apparatus comprising:
a. a first over-voltage protection circuit disposed between a hot line and a ground line;
b. a second and a third over-voltage protection circuit disposed between the hot line and a neutral line, each circuit having a thermal fuse in series with the neutral line; and
c. a fourth over-voltage protection circuit disposed between the neutral line and the ground line;
the apparatus providing AC power to the at least one peripheral device, whereby the hot line and the neutral line are not distributed as an output voltage when the second and third over-voltage protection devices has opened a protective device.

12. The method, as recited in claim 11, further comprising:
providing a warning means for indicating that the input hot line and neutral line are reversed; and
providing at least one warning means for indicating that an over-voltage condition has occurred, the at least one warning means being selected from a group of warning means consisting essentially of an indicator light, an LED indicator, an audible alarm; and
warning that an over-voltage condition has occurred by activating the provided warning feature.

13. The method of claim 12 further comprising providing an electronic interference filter on the input of the apparatus.

14. The method of claim 11 further comprising providing an electronic interference filter on the output of the apparatus.

* * * * *